(12) United States Patent
Ang et al.

(10) Patent No.: US 6,744,966 B2
(45) Date of Patent: Jun. 1, 2004

(54) RADIATION INSENSITIVE FIBER LIGHT SOURCE FOR INTERFEROMETRIC FIBER OPTIC GYROSCOPES (IFOGS)

(75) Inventors: Dick Ang, Glendale, AZ (US); Timothy L. Spicer, Phoenix, AZ (US); Ren-Young Liu, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 147 days.

(21) Appl. No.: 09/993,995

(22) Filed: Nov. 14, 2001

(65) Prior Publication Data

US 2003/0091321 A1 May 15, 2003

(51) Int. Cl.[7] .............................. G02B 6/00; G02B 6/16
(52) U.S. Cl. ....................................... 385/147; 385/123
(58) Field of Search ............................... 385/123, 147; 372/6

(56) References Cited

U.S. PATENT DOCUMENTS

| | | | |
|---|---|---|---|
| 6,025,915 A | 2/2000 | Michal et al. | 385/15 |
| 6,108,086 A | 8/2000 | Michal et al. | 356/350 |
| 6,144,788 A | * 11/2000 | Ang et al. | 385/31 |
| 6,205,265 B1 | * 3/2001 | Rozelle et al. | 385/15 |
| 6,429,965 B1 | * 8/2002 | Falquier et al. | 359/341.1 |

FOREIGN PATENT DOCUMENTS

| | | | | |
|---|---|---|---|---|
| EP | 1 079 482 A3 | 2/2001 | | H01S/3/067 |
| EP | 1 079 482 A2 | 2/2001 | | H01S/3/067 |

* cited by examiner

*Primary Examiner*—Brian Healy
*Assistant Examiner*—Kevin S. Wood
(74) *Attorney, Agent, or Firm*—Schiff Hardin LLP

(57) ABSTRACT

An example of a fiber optic light source has a pump laser that feeds light to a length of doped optical fiber. The optical fiber produces light that has a mean wavelength, for example in the range of 1515 nm to 1544 nm, such that the light is substantially unaffected when exposed to weapons level radiation.

33 Claims, 3 Drawing Sheets

RADIATION INSENSITIVE FIBER LIGHT SOURCE FOR INTERFEROMETRIC FIBER OPTIC GYROSCOPES (IFOGS)

The U.S. Government has a paid-up license in this invention and the right in limited circumstances to require the patent owner to license others on reasonable terms as provided for by the terms of a contract N00030-96-C-0028 with the Navy.

FIELD OF INVENTION

The present invention relates to a fiber light source configured to emit light which is substantially insensitive to weapons level radiation, and which is particularly useful as a light source for an interferometric fiber optic gyroscope (IFOG).

BACKGROUND OF THE INVENTION

Interferometric fiber optic gyroscopes (IFOG's) are gyroscopes in which a light source is used to produce a signal representative of the rotational state of a moving craft in which the gyroscope is located.

Prior to the present invention, conventional wisdom suggested that a light source for an interferometric fiber optic gyroscope should have a power output with as wide a spectral width as possible. Hence, the power output of a light source for an interferometric fiber optic gyroscopes has tended to be centered about a mean wavelength in the range of about 1540 nm to 1570 nm, but may also have significant power output centered about lower wavelength(s).

However, Applicants have discovered that with an interferometric fiber optic gyroscope (IFOG), a light source with power output centered about a mean wavelength in the range of 1540 nm to 1570 nm can be severely attenuated when exposed to weapons level radiation threat such as gamma or neutron radiation threat. Such attenuation can significantly affect the gyroscope's mean operating wavelength and the detected light level. Hence, an explosion or other event that exposes the interferometric fiber optic gyroscope to weapons level gamma or neutron radiation can significantly affect the gyroscope's scale factor and random noise performance.

According to the present invention, Applicants have departed from conventional wisdom in interferometric fiber optic gyroscopes by their discovery that there is a mean wavelength range, and a preferred mean wavelength, at which an interferometric fiber optic gyroscope can perform its desired function, and in a manner whereby the light source is substantially unaffected by weapons level radiation threat such as gamma or neutron radiation. By "substantially unaffected", it is meant that a substantial amount of power output from the light source is centered about a mean wavelength and does not drift by more than a predetermined amount when exposed to weapons level radiation. The amount of power output centered about the mean wavelength, and the amount of drift that can be tolerated, and still remain "substantially unaffected" by weapons level radiation may vary somewhat, depending upon the craft with which the light source is associated.

SUMMARY OF THE INVENTION

The present invention provides a new and useful fiber light source, configured to produce light with a mean wavelength which is substantially unaffected when exposed to weapons level radiation threat.

According to a preferred embodiment, the fiber light source is configured to produce a light output with a mean wavelength in the range of about 1520 to 1540 nm, and preferably substantially centered about a mean wavelength of about 1532 nm.

Moreover, according to the present invention, the light source is configured to be substantially unaffected by weapons level radiation when measured by one of a pair of criteria. By one criteria, the light source is configured to produce a light output shaped such that more than 50%, preferably at least 85%, and most preferably at least 99% of power is within a mean wavelength range of 1515 nm to 1545 nm, and is substantially centered about a mean wavelength (preferably 1532 nm) within that mean wavelength range. By another criteria, the light source is configured such that when exposed to weapons level radiation the output of the light source has a mean wavelength drift of less than 500 ppm (parts per million), preferably less than 150 ppm, and most preferably less than 15 ppm.

A fiber light source according to the invention comprises a light generator (e.g. a pump laser) and a material (preferably a length of fiber optic material) which is configured to receive light from the light generator and re-emit the light in the desired mean wavelength range. The configuration of the length of fiber optic material will depend on the specific properties of the fiber, but with the preferred fiber material (i.e. a length of Erbium Doped Fiber), the length of fiber would be designed to re-emit light in the predetermined mean wavelength range.

According to a preferred embodiment, an interferometric fiber optic gyroscope includes a fiber light source comprising a 980 nm pump laser and a length of Erbium Doped Fiber (EDF) configured to receive the light from the pump laser and to re-emit the light with a mean wavelength which is substantially unaffected by weapons level radiation threat. The length of EDF receives the 980 nm light from the pump laser, and re-emits the light at a longer mean wavelength which is useful in an interferometric fiber optic gyroscope. Specifically, the length of the EDF optimizes the mean wavelength of the re-emitted light to produce power output in a range of about 1515 to 1545 nm and substantially centered about a wavelength in that range. Preferably, the power output is substantially centered about a mean wavelength of about 1532 nm. According to the preferred embodiment, with a 980 nm pump laser, the EDF would have a length of about 5 to 15 meters, to re-emit the light in the foregoing mean wavelength range. The particular length of the EDF may be determined by the particular characteristics of the EDF used. Additionally, in order to produce re-emitted light with virtually no attenuation (i.e. at least 99% of output power centered about a mean wavelength of about 1532 nm, and less than 15 ppm mean wavelength drift) when exposed to weapons level radiation, the re-emitted light is preferably filtered (e.g. by band filter grating).

Further features of the present invention will be apparent from the following detailed description and the accompanying drawings.

BRIEF DESCRIPTION OF THE DRAWINGS

FIG. 2b is a graph illustrating the light output of the light source of FIG. 2a;

FIG. 3b is a graph illustrating the light output of the light source of FIG. 3a.

DETAILED DESCRIPTION

As described above, the present invention is particularly useful with an interferometric fiber optic gyroscope (IFOG) which can be exposed to weapons level radiation threat. The principles of the present invention are described below in connection with an interferometric fiber optics gyroscope, but it will be clear to those in the art that such principles can also be used more generally to provide a light source which is substantially unaffected when exposed to weapons level radiation threat.

Initially, it is useful to provide some background on fiber optic gyroscopes, particularly interferometric fiber optic gyroscopes. A fiber optic gyroscope is useful in sensing rotation of an object (e.g. a vehicle) supporting the gyroscope. Such a gyroscope can be made small and can be constructed to withstand considerable mechanical shock, temperature change, and other environmental extremes. Due to the absence of moving parts, the gyroscope can be nearly maintenance free. The present invention provides a further enhancement for a fiber optic gyroscope, in the form of a fiber light source that is substantially unaffected by weapons level radiation threat.

A fiber optic gyroscope has a coiled optical fiber wound on a core and about the axis thereof around which rotation is to be sensed. The coiled optical fiber is typically of a length of 100 to 5,000 meters, or so, and is part of a closed optical path in which an electromagnetic wave, or light wave, is introduced and split into a pair of waves to propagate in opposite directions through the con to both ultimately impinge on a photo detector. This optical arrangement is referred to as the Sagnac interferometer. Rotation about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyroscope (IFOG). The use of a coiled optical fiber is desirable because the amount of phase difference shift due to rotation, and thus the output signal, depends on the length of the entire optical path, through the coil traversed by the two electromagnetic waves traveling in opposed direction, and so a large phase difference can be obtained in the long optical fiber but in the relatively small volume taken by it as a result of being coiled.

Figure 1:
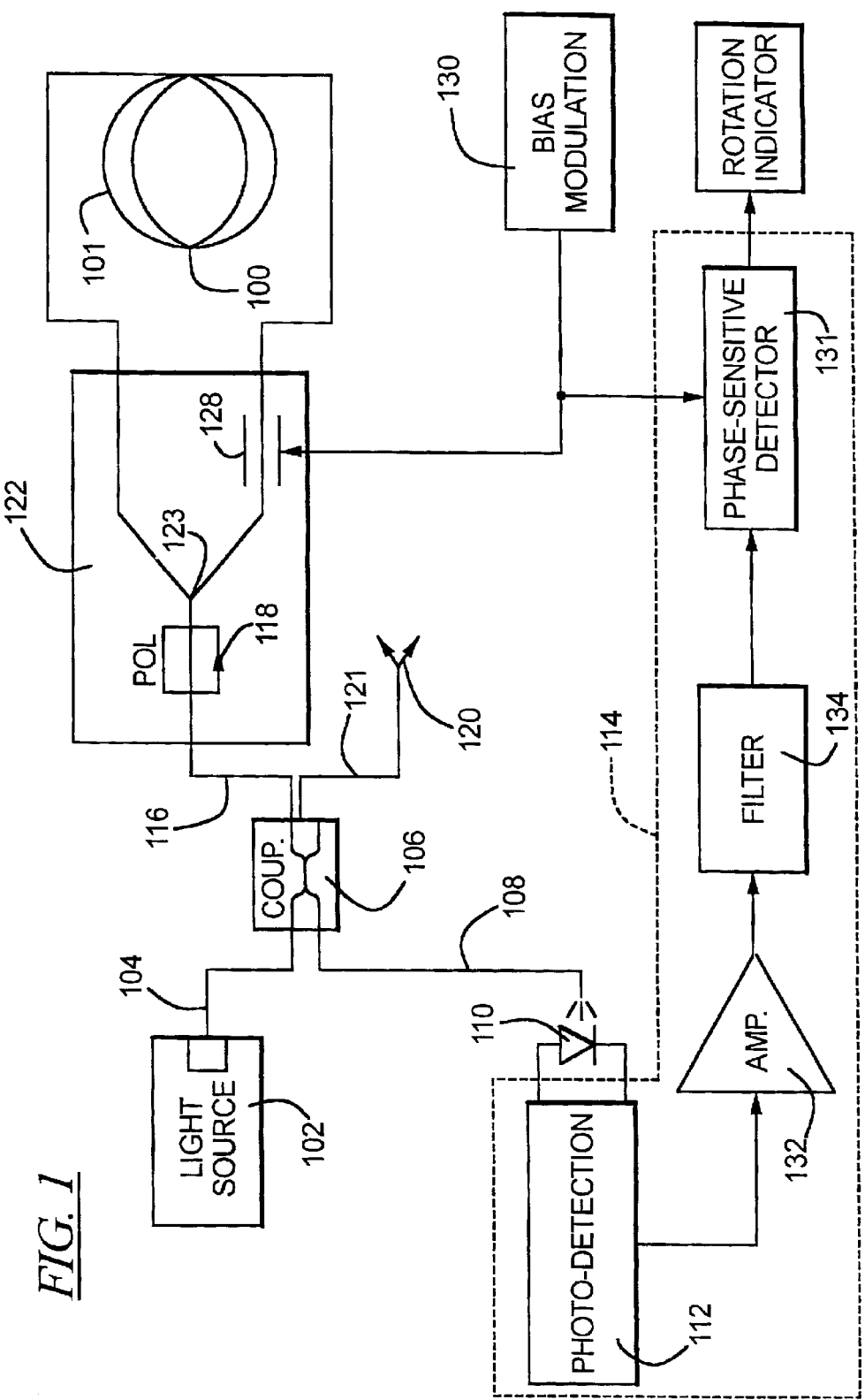
FIG. 1 is a schematic illustration of the optical portion of an interferometric fiber optic gyroscope, in which a light source constructed according to the principles of the present invention can be incorporated.

An example of the optical portion of such a system is shown in FIG. 1. The coiled optical fiber 101 forms a coil 100 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber 101 can be so-called polarization-maintaining fiber in that a very significant birefringence is constructed in the fiber so that polarization fluctuations introduced by unavoidable mechanical stresses or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves, which propagate in opposite directions through coil 100, are provided from a fiber light source 102 in FIG. 1. The fiber light source 102 is constructed according to the principles of the present invention, provides electromagnetic waves in the near infrared part of the spectrum, and is described in more detail below. Fiber light source 102 must have a short coherence length for emitted light to reduce the phase shift difference errors between these waves due to Rayleigh and Fresnel scattering at scattering sites in coil 100. Because of the nonlinear Kerr effect in coil 100, different intensities in the two counter propagating waves can lead to different phase shifts therebetween. This situation can be overcome also by use of a short coherence length source for source 102 that emits light with suitable statistical properties. Between fiber light source 102 and fiber optic coil 100 there is shown an optical path arrangement in FIG. 1 formed by the extension of the ends of the optical fiber 101 which forms coil 100 to some optical coupling components which separate the overall optical path into several optical path portions. An optical fiber 104 transmits light emitted from fiber light source 102, at a point of optimum light emission therefrom, to a first optical directional coupler 106.

Optical directional coupler 106 has light transmission media therein which extend between four ports, two on each end of that media, and which are shown on each end of coupler 106 in FIG. 1. One of these ports has the optical fiber 104 extending from light source 102 positioned there against. At the other port on the sense end of the optical directional coupler 106 there is shown a further optical fiber 108 positioned thereagainst which extends to be positioned against a photodiode 110, which is electrically connected to a photodetection system 112.

Photodiode 110 detects electromagnetic waves, or light waves, impinging thereon from the portion of the optical fiber 108 positioned thereagainst and provides a photo current in response to a signal component selection means 114. This photo current, as indicated above, in the case of two nearly coherent light waves impinging thereon, follows a cosine function in providing a photo current output which depends on the cosine of the phase difference between such a pair of substantially coherent light waves. This photovoltaic device will operate into a very low impedance to provide the photo current, which is a linear function of the impinging radiation, and may typically be a p-i-n photodiode.

Optical directional coupler 106 has another optical fiber 116 against a port at the other end thereof. The optical fiber extends to an integrated optics chip (IOC) 122. At the other port on that same side of coupler 106 there is a non-reflective termination arrangement 120, involving another optical fiber 121.

Optical directional coupler 106, in receiving light from the fiber light source 102, at any port thereof, transmits such light so that approximately half thereof appears at each of the two ports of coupler 106 on the end thereof opposite that end having the incoming port. On the other hand, no such waves or light is transmitted from the light source 102 to the port which is on the same end of coupler 106 as is the incoming light port.

Integrated optics chip 122 may be formed of any suitable material and typically includes a polarizer 118, a Y-junction 123, and one or more phase modulators 128 for modulating light passing through IOC 122. Y-junction 123 suitably divides light passing in a first direction into two separate paths and suitably re-combines light travelling in the opposite direction onto a single path.

Polarizer 118 is used because, even in a single spatial mode fiber, light can propagate in two polarization modes through the fiber. Thus, polarizer 118 is provided for the purpose of passing light propagating of one polarization, such that clockwise (cw) and counterclockwise (ccw) waves of the same polarization are introduced into the sensing loop and only light from the sensing loop of the same polarization for the cw and ccw waves are interfered at the detector. Polarizer 118, however does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which the polarizer is placed. In this regard, the high birefringence in the optical fiber used again aids in reducing this resulting phase difference, as indicated above.

Considering the ports on the other end of IOC 122, one is connected to further optical components in the optical path portions extending thereto from one end of the optical fiber 101 in coil 100. The other port in IOC 122 is coupled to the remaining end of optical fiber 101. Between coil 100 and polarizer 118 may be provided an optical phase modulator 128. Although only one phase modulator 128 is shown in FIG. 1, additional phase modulators may also be inserted between polarizer 118 and optical loop 100. Optical modulator 128 is capable of receiving electrical signals to cause it to introduce a phase difference in electromagnetic waves transmitted therethrough by changing the index of refraction of the transmission medium, or transmission media, therein to thereby change the optical path length. Such electrical signals are supplied to modulator 128 by a bias modulation signal generator 130 providing a sinusoidal voltage output signal at a modulation frequency $f_g$ that is typically intended to be equal to $C_1 \sin(\omega_g t)$ where $\omega_g$ is the radian frequency equivalent of the modulation frequency $f_g$. Other suitable periodic waveforms could alternatively be used, and many different types of bias modulation schemes have been implemented.

The above completes the description of the optical portion of the system of FIG. 1 formed along the optical path followed by the electromagnetic waves, or light waves, emitted by source 102. Such electromagnetic waves are coupled from that source through the optical fiber portion 104 to optical directional coupler 106. Some of such wave entering coupler 106 from light source 102 is lost in non-reflecting terminating arrangement 120 coupled to a port on the opposite end of optical directional couples 106, but the rest of that wave is transmitted through polarizer 118 to the Y-junction 123.

Optical phase modulator 128 is of the kind used in conjunction with a phase-sensitive detector 131 as part of a demodulation system for converting the output signal of photodetection system 112, which follows a cosine function, to a signal following a sine function. Following such a sine function provides in that output signal information both as to the rate of rotation and the direction of that rotation about the axis of coil 100.

The output signal from photodetection system 112, including the photodiode 110, is converted to a voltage and provided through an amplifier 132, where it is amplified and passed through a filter 134, to the phase sensitive detector 131. Photodetection system 112, amplifier 132, filter 134 and phase sensitive detector 131 constitute signal component selection means. Phase-sensitive detector 131, serving as part of a phase demodulation system, is a well known device. Such a phase-sensitive detector extracts the amplitude of the first harmonic of the filtered photodiode system output signal, or the fundamental frequency of modulation signal generator 130, to provide an indication of the relative phase of the electromagnetic waves impinging on photodiode 110. This information is provided by phase-sensitive detector 131 in an output signal following a sine function, that is, this output signal follows the sine of the phase difference between the two electromagnetic waves impinging on photodiode 110.

A proton-exchanged waveguide could be used for the integrated optics chip (IOC) 122. Such a proton-exchanger IOC is a polarizer because it only guides one polarization mode and does not guide the other polarization mode at all. Therefore, substitution of a proton-exchanged waveguide for the integrated optics chip (IOC) 122 would eliminate the need for the polarizer 118.

Also, for an interferometric fiber optic gyroscope, which employs a single mode, non polarization maintaining optical fiber coil, two fiber depolarizers may be included in the sensing loop, one each at either end of the sensing loop between the IOC pigtail and the coil input. These depolarizers (45° splicing between two PM fibers with predetermined fiber lengths) assure equal power distribution between the two polarization modes propagating through the sensing coil. Therefore, errors produced by any cross-coupling between the two polarization modes will be in pairs and cancel each other out so as to achieve good bias stability.

Figure 2A:
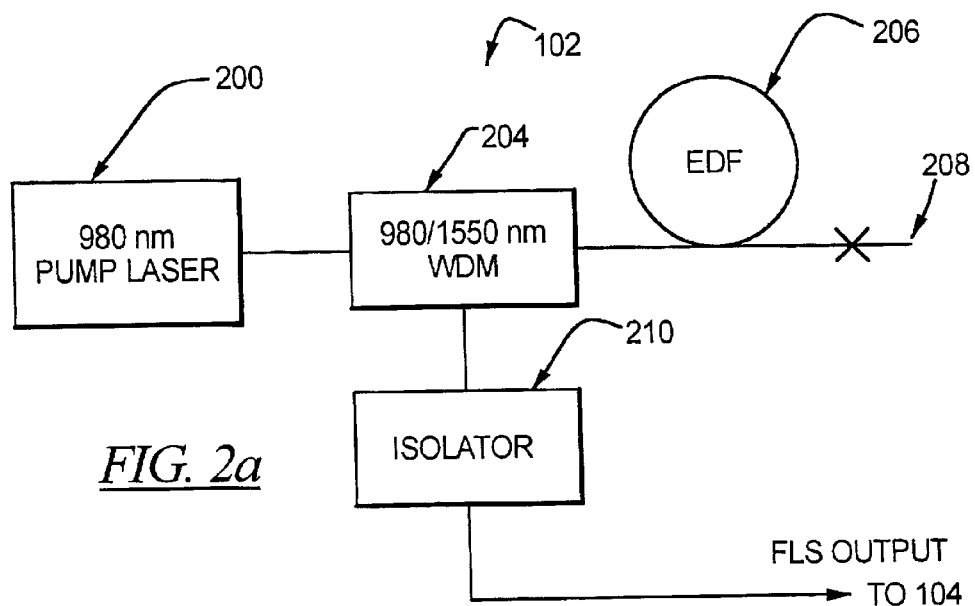
FIG. 2a is a schematic illustration of a fiber light source, according to the present invention, which is useful in an interferometric fiber optic gyroscope such as the interferometric fiber optic gyroscope of, FIG. 1.

FIG. 2a schematically illustrates the components of a light source 102, according to the present invention, which is useful in the system of FIG. 1, and which is designed with protection from weapons level radiation threat. More specifically, the light source of FIG. 2a is configured to produce light shaped such that at least 85% of the output power is within a mean wavelength range of 1515 nm to 1545 nm and is substantially centered about a mean wavelength of 1532 nm. Such output is graphically illustrated by FIG. 2b.

The components of the light source of FIG. 2a include a 980 nm pump laser 200, a 980/1550 wavelength division multiplexing (WDM) coupler 204, a length of Erbium Doped Fiber (EDF) 206 with a non reflective termination 208 which eliminates or at least reduces reflection in the EDF fiber, and an optical isolator 210. The EDF 206 receives and re-emits light from the pump laser 200, which re-emitted light has a mean wavelength that is substantially unaffected when exposed to weapons level radiation threat. The re-emitted light, at the new mean wavelength, is directed via the WDM coupler 204 and the optical isolator 210 to the optical fiber 104 in the optical system of FIG. 1. The optical isolator 210 enables re-emitted light to be transmitted to the optical system of FIG. 1 while keeping the fiber light source isolated from the optical system.

Figure 2B:
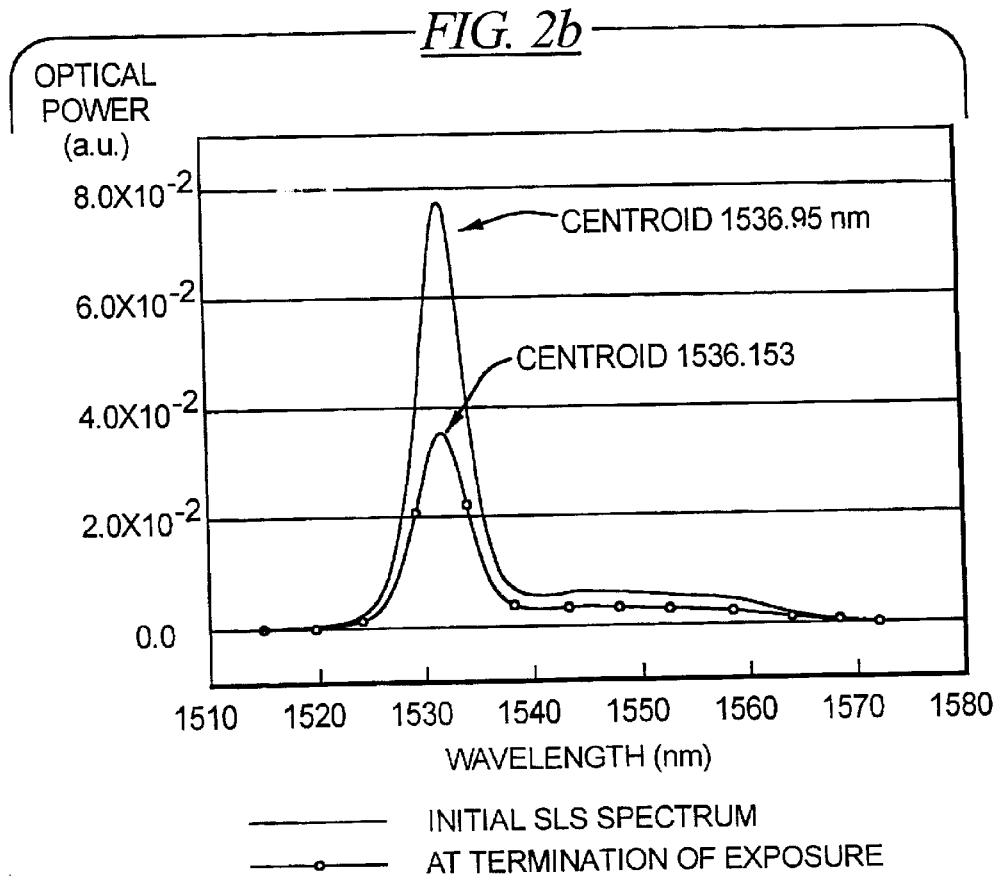

In the fiber light source of FIG. 2, light from the 980 nm pump 200 is directed via the 980/1550 WDM coupler 204 into the EDF 206. The EDF 206 absorbs the 980 nm pump light, whereby Erbium ions in the fiber core of the EDF are stimulated (optically pumped) and the Erbium ions re-emits at longer wavelengths e.g. at 1532 nm and 1560 mean wavelengths. By optimizing the length of the EDF the light output can be produced such that at least 85% of the power is in the 1515–1545 nm mean wavelength range, and is preferably centered about a mean wavelength of 1532 nm. An EDF of the preferred type, i.e. a Type HG-980, made by Lucent Technologies, Inc., with a length in the range of 5–15 meters, and preferably in the range of 6 to 12 meters, can be optimized to produce re-emitted light with the foregoing characteristics. FIG. 2*b* illustrates the power of such a light source. Specifically, the light source produces re-emitted light such that at least 85% of the power output is located within a mean wavelength range of 1515 nm to 1545 nm and is substantially centered about a single peak at about 1532 nm. Moreover, as illustrated schematically in FIG. 2*b*, in the event of exposure to weapons level radiation, the mean wavelength has less than 150 ppm drift, i.e. it remains substantially centered at about 1532 nm.

According to the method of the present invention, light is generated in a wavelength useful in an interferometric fiber optic gyroscope IFOG, by generating light from the pump laser 200 in a predetermined wavelength range, receiving and re-emitting the light by means of the Erbium Doped Fiber 206, to produce the light which is delivered to the interferometric fiber optic gyroscope in a wavelength range in which it is substantially unaffected by weapons level radiation threat. The length of Erbium Doped Fiber 206 is preferably configured to re-emit the generated light from the pump laser, and produce light output shaped such that it is within a mean wavelength range of 1515 nm to 1545 nm, and is substantially centered about a mean wavelength of 1532 nm.

It will also be apparent to those in the art that the length of fiber optic material 206, which can optimize the light output in accordance with the present invention, will depend on the specific properties of the fiber, but with the preferred material, i.e. Erbium Doped Fiber, the length of fiber would be in the range of about 5 to 15 meters, and preferably in the range of about 6 to 12 meters. The particular length of Erbium Doped Fiber that can produce a light output in accordance with FIG. 2*b* will depend on the particular characteristics of the fiber used (e.g. the level of doping, etc.). Moreover, it will be apparent to those in the art, particularly those in the art of interferometric fiber optic gyroscopes (IFOGS), that while a light source configured with the characteristics of FIG. 2*a*, and designed to produce a light output in accordance with FIG. 2*b*, is particularly desirable for many IFOG application, for some IFOG applications, a lower level of attenuation resistance may be tolerable. For example, for some IFOG applications, a light source which produces light output in which more than 50% of power is within the mean wavelength range of 1515 nm to 1545 nm and is centered about a mean wavelength in that range, and where a mean wavelength drift of less than 500 ppm is achieved, is acceptable for such applications.

Figure 3A:
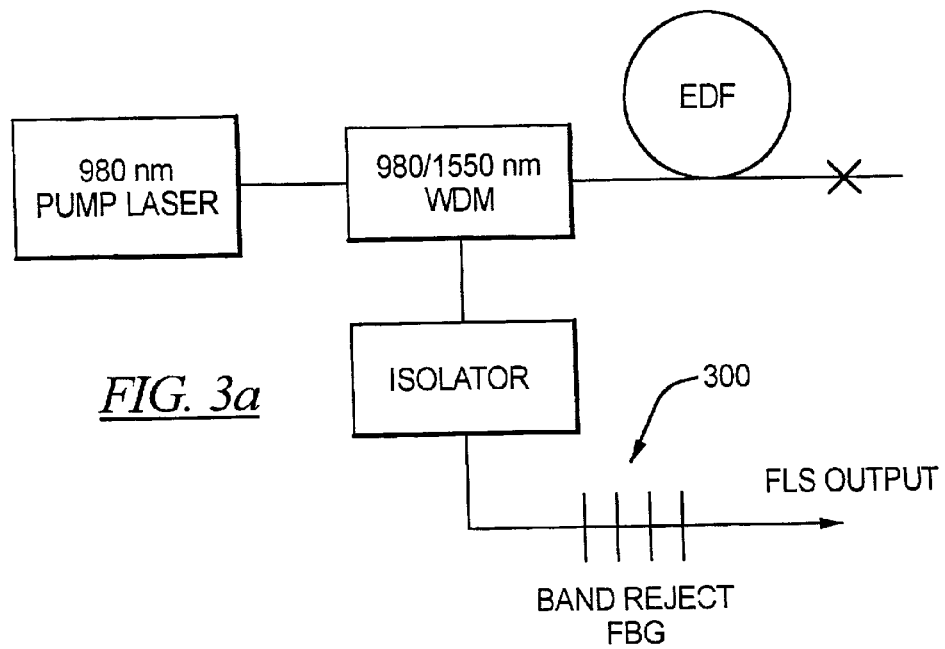
FIG. 3a is a schematic illustration of a fiber light source, according to the present invention, which is useful in an interferometric fiber optic gyroscope such as the interferometric fiber optic gyroscope of FIG. 1, and which is configured to minimize the attenuation of the light output when exposed to weapons level radiation.
Figure 3B:
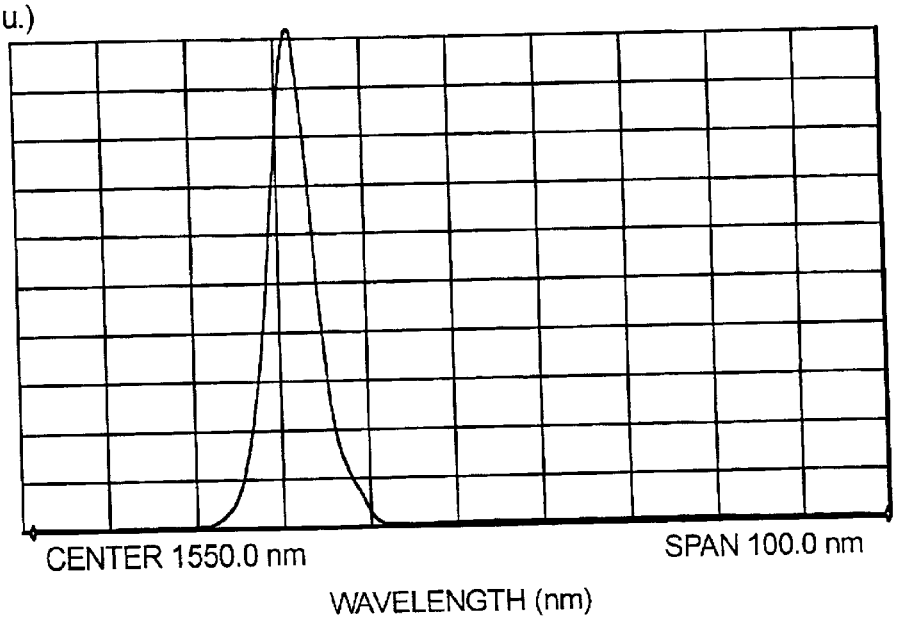

On the other hand, it will also be apparent to those in the art that for some IFOG applications, a light source with even a higher level of resistance to attenuation when exposed to weapons level radiation is required. The system illustrated in FIG. 3*a* is configured to provide such a higher level of resistance to attenuation, as demonstrated by the graph of FIG. 3*b*. More particularly, the system of FIG. 3*a* has all of the components of the system of FIG. 2*a*, and has the additional feature of a filter, preferably a band filter grating (BFG) 300 located downstream of the optical isolator. The band filter grating 300 further removes light output outside the 1545 nm mean wavelength level, and centers virtually the entire output about the 1532 nm mean wavelength, as graphically shown in FIG. 3*b*. Thus, with the configuration of FIG. 3*a*, the light source can be optimized to produce a light output in which at least 99% of power is disposed within the 1515 nm to 1545 nm mean wavelength range and has a mean wavelength drift of less than 15 ppm. Such a light source is capable of functioning in under very stringent conditions in an IFOG application.

Thus, as seen from the foregoing description, the present invention provides a light source for, e.g., an interferometric fiber optic gyroscope which is specifically configured with protection against weapons level radiation threat. It will also be clear to those in the art that the principles of the present invention can be used with light sources for other purposes, where there is a need to protect the light source against weapons level radiation threat.

What is claimed is:

1. Apparatus comprising a light source configured to produce a light output shaped such that at least 85% of power is (i) within a 1515 nm to 1545 nm mean wavelength range and (ii) substantially centered about a mean wavelength within the 1515 nm to 1545 nm mean wavelength range.

2. The apparatus of claim 1 wherein the light source is configured such that at least 99% of power is (i) within the 1515 nm to 1545 nm mean wavelength range and (ii) substantially centered about a mean wavelength in the 1515 nm to 1545 nm mean wavelength range.

3. The apparatus of claim 2 wherein the light source is configured such that at least 99% of power is substantially centered about a mean wavelength of 1532 nm.

4. The apparatus of claim 1 further comprising an interferometric optical gyroscope, wherein the light output of the light source is directed to the interferometric optical gyroscope.

5. The apparatus of claim 4 further including an isolator for isolating the light source from the interferometric optical gyroscope.

6. The apparatus of claim 1 wherein the light source comprises a pump laser and a material which receives light from the pump laser and re-emits the light at a mean wavelength within the 1515 nm to 1545 nm wavelength range.

7. The apparatus of claim 6 wherein the material comprises a length of optical fiber.

8. The apparatus of claim 7 wherein the length of optical fiber comprises a length of Erbium doped optical fiber.

9. The apparatus of claim 8 wherein the pump laser comprises a 980 nm pump laser, and wherein the length of Erbium doped optical fiber has a length in the range of 5–15 meters.

10. Apparatus comprising:
    a light source configured to produce a light output with a mean wavelength drift of less than 500 ppm (parts per million) when exposed to weapons level radiation; and,
    a band reject filter grating that filters the light output.

11. The apparatus of claim 10 wherein the band reject filter grating removes light output above the 1545 nm mean wavelength level.

12. The apparatus of claim 10 wherein the band reject filter grating centers virtually the entire light output about the 1532 nm mean wavelength.

13. The apparatus of claim 12 wherein the band reject filter grating removes light output outside the 1545 nm mean wavelength level.

14. The apparatus of claim 10 wherein the light source is configured to shape the light output such that at least 85% of power is (i) within a 1515 nm to 1545 nm mean wavelength range and (ii) substantially centered about a mean wavelength within the 1515 nm to 1545 nm mean wavelength range.

15. The apparatus of claim 14 wherein the light source is configured such that at least 99% of power is (i) within the 1515 nm to 1545 nm mean wavelength range and (ii) substantially centered about a mean wavelength in the 1515 nm to 1545 nm mean wavelength range.

16. The apparatus of claim 15 wherein the light source is configured such that at least 99% of power is substantially centered about a mean wavelength of 1532 nm.

17. The apparatus of claim 10 further comprising an interferometric optical gyroscope, wherein the output of the light source is directed to the interferometric optical gyroscope.

18. The apparatus of claim 17 further including an isolator for isolating the light source from the interferometric optical gyroscope.

19. The apparatus of claim 10 wherein the light source comprises a pump laser and a material which receives light from the pump laser and re-emits the light at a mean wavelength within the 1515 nm to 1545 nm wavelength range.

20. The apparatus of claim 19 wherein the material comprises a length of optical fiber.

21. The apparatus of claim 20 wherein the length of optical fiber comprises a length of Erbium doped optical fiber.

22. The apparatus of claim 21 wherein the pump laser comprises a 980 nm pump laser, and wherein the length of Erbium doped optical fiber has a length in the range of 5–15 meters.

23. Apparatus comprising:
   a fiber optic light source that provides a light output, wherein the fiber optic light source includes a pump laser and a length of doped optical fiber, wherein the length of doped optical fiber is configured to receive light from the light pump and to re-emit the light with a predetermined spectrum and mean wavelength between 1515 nm and 1545 nm so that the light output of the fiber optic light source is substantially unaffected when the fiber optic light source is exposed to weapons level radiation;
   a filter that filters the light output to remove light having a mean wavelength greater than 1545 nm; and,
   an interferometric optical gyroscope coupled to receive the filtered light output.

24. The apparatus of claim 23 wherein the filter comprises a band reject filter grating.

25. The apparatus of claim 23 wherein the light source is configured to shape the light output such that at least 85% of power is (i) within a 1515 nm to 1545 nm mean wavelength range and (ii) substantially centered about a mean wavelength within the 1515 nm to 1545 nm mean wavelength range.

26. The apparatus of claim 25 wherein the light source is configured such that at least 99% of power is (i) within the 1515 nm to 1545 nm mean wavelength range and (ii) substantially centered about a mean wavelength in the 1515 nm to 1545 nm mean wavelength range.

27. The apparatus of claim 26 wherein the light source is configured such that at least 99% of power is substantially centered about a mean wavelength of 1532 nm.

28. The apparatus of claim 23 further including an isolator for isolating the light source from the interferometric optical gyroscope.

29. The apparatus of claim 23 wherein the doped optical fiber comprises a length of optical fiber.

30. The apparatus of claim 29 wherein the length of optical fiber comprises a length of Erbium doped optical fiber.

31. The apparatus of claim 27 wherein the length of optical fiber has a length in the range of 5–15 meters.

32. The apparatus of claim 31 wherein the length of optical fiber comprises a length of Erbium doped optical fiber.

33. The apparatus of claim 23 wherein the mean wavelength is 1532 nm.

* * * * *

UNITED STATES PATENT AND TRADEMARK OFFICE
CERTIFICATE OF CORRECTION

PATENT NO. : 6,744,966 B2
DATED : June 1, 2004
INVENTOR(S) : Dick Ang, Timothy L. Spicer and Ren-Young Liu It is certified that error appears in the above-identified patent and that said Letters Patent is hereby corrected as shown below:

Column 3,
Line 39, change "con" to -- coil --.
Line 53, change "path,", to -- path --.

Column 6,
Line 24, change "proton-exchanger" to -- proton-exchanged --.

Signed and Sealed this

Twenty-sixth Day of April, 2005

JON W. DUDAS
*Director of the United States Patent and Trademark Office*